United States Patent

Maes

[11] Patent Number: 5,882,569
[45] Date of Patent: Mar. 16, 1999

[54] METHOD AND INSTALLATION FOR MANUFACTURING DECORATIVE PANELS

[76] Inventor: Carlo Maes, Arkstraat 21,B-3620, Lanaken, Belgium

[21] Appl. No.: 619,566

[22] PCT Filed: Oct. 12, 1994

[86] PCT No.: PCT/BE94/00067

§ 371 Date: Jun. 27, 1996

§ 102(e) Date: Jun. 27, 1996

[87] PCT Pub. No.: WO95/10423

PCT Pub. Date: May 20, 1995

[30] Foreign Application Priority Data

Oct. 15, 1993 [BE] Belgium ................................ 09301096

[51] Int. Cl.⁶ .................................................. B29C 59/02
[52] U.S. Cl. ............................ 264/293; 264/321; 425/73; 425/385; 425/397; 425/398
[58] Field of Search .................................... 264/321, 293; 425/385, 398, 397, 73

[56] References Cited

U.S. PATENT DOCUMENTS

| | | | |
|---|---|---|---|
| 2,914,109 | 11/1959 | Hsu et al. | 264/293 |
| 2,928,124 | 3/1960 | Hugger | 425/385 |
| 2,946,713 | 7/1960 | Dusina, Jr. et al. | 264/293 |
| 3,387,330 | 6/1968 | Lemelson | 425/385 |
| 3,398,224 | 8/1968 | Spencer | 264/293 |
| 3,632,266 | 1/1972 | Winstead | 425/385 |
| 3,655,312 | 4/1972 | Erb et al. | 264/321 |
| 3,741,851 | 6/1973 | Erb et al. | 264/321 |
| 3,818,085 | 6/1974 | Marsland, Jr. et al. | 264/293 |
| 3,836,624 | 9/1974 | Ferris | 264/293 |
| 3,932,245 | 1/1976 | Erb et al. | 264/321 |
| 3,961,875 | 6/1976 | Sprague | 425/385 |
| 4,048,269 | 9/1977 | Wisotzky et al. | 264/293 |
| 4,053,549 | 10/1977 | Vandor | 264/293 |
| 4,089,731 | 5/1978 | Lewicki, Jr. | 425/385 |
| 4,131,663 | 12/1978 | Lewicki, Jr. | 264/321 |
| 4,178,161 | 12/1979 | Rudner et al. | 264/293 |
| 4,283,240 | 8/1981 | Speer | 756/98 |
| 4,486,363 | 12/1984 | Pricone et al. | 264/284 |
| 4,643,787 | 2/1987 | Goodman | 156/196 |
| 5,350,544 | 9/1994 | Bambara et al. | 264/293 |
| 5,401,456 | 3/1995 | Alesi, Jr. et al. | 264/511 |

FOREIGN PATENT DOCUMENTS

| | | | |
|---|---|---|---|
| 0206755 | 6/1986 | European Pat. Off. | |
| 0288728 | 3/1988 | European Pat. Off. | |
| 0299168 | 5/1988 | European Pat. Off. | |
| 2007388 | 9/1971 | Germany | 425/385 |
| 3640345 | 6/1988 | Germany | 264/293 |
| 58-209534 | 12/1983 | Japan | 264/321 |
| 1192523 | 8/1989 | Japan | 264/293 |
| 3-75131 | 3/1991 | Japan | 264/293 |

*Primary Examiner*—Allan R. Kuhns
*Attorney, Agent, or Firm*—Lackenbach Siegel, Marzullo Aronson & Greenspan

[57] ABSTRACT

A method and an apparatus for manufacturing decorative panels with relief decorations on at least one of the broad sides of the panel are described. In a chamber, a hard, at least partly thermoplastic resin foam sheet with an essentially closed cell structure is substantially evenly heated on at least one of its broad sides, such that it becomes soft. Then, by means of a mould, the decorations in raised and/or sunken relief are applied to at least one of the broad sides by pressing.

9 Claims, 5 Drawing Sheets

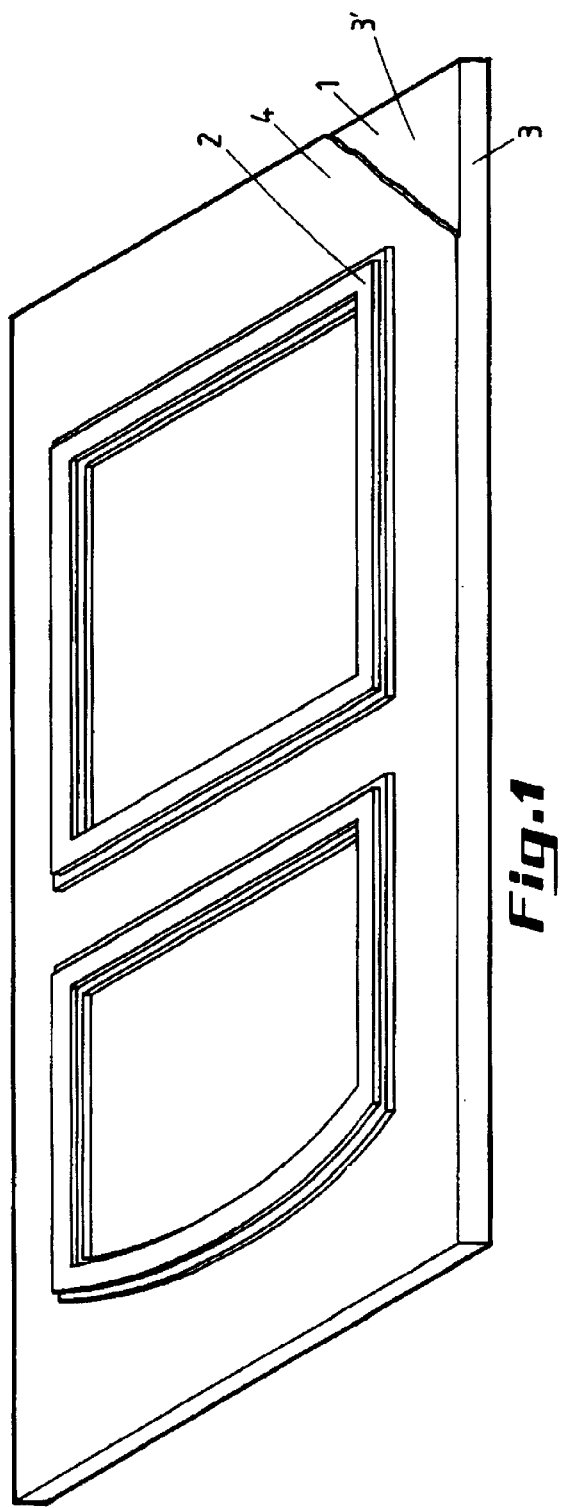
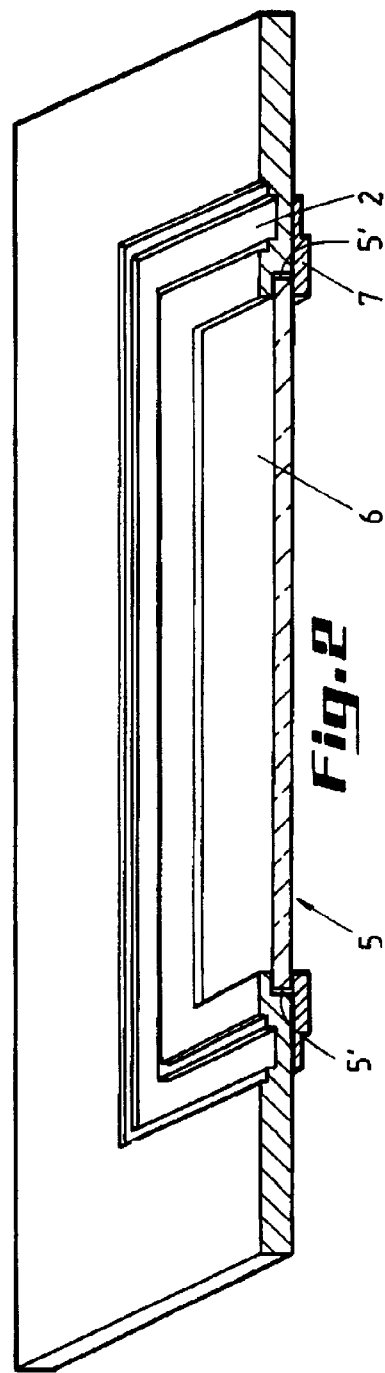

METHOD AND INSTALLATION FOR MANUFACTURING DECORATIVE PANELS

This invention concerns a method for manufacturing decorative panels with a decoration in relief on at least one of the broad sides of the panel.

According to a known method, such decorative panels are at present made by attaching the decorations to the panel by means of adhesive, screws or suchlike. A disadvantage of this method is that these decorations become detached or cracked in the course of time. Furthermore, it is generally necessary to apply an additional coat of paint over the assembly.

Another known method consists of sticking a PVC sheet 2 to 3 mm thick, formed under vacuum, onto a core of wood or plastic. In this case it is observed that after a certain time this film becomes detached or cracked due to differences in the coefficient of expansion.

Furthermore, the method at present used for making such decorative panels is very tedious and labour-intensive. In connection with said known methods the following patent specifications among others should be referred to: EP 0288.728, EP 0206.755, EP 299.168, U.S. Pat. No. 4,643,787.

The aim of the present invention is to overcome these different disadvantages, and to offer a method which completely precludes the detachment or cracking of the decorations and furthermore is much simpler than the existing methods.

According to the invention, one begins with a hard, at least partly thermoplastic artificial resin foam sheet which is substantially evenly heated on one of its broad sides until a soft, plastic mass is obtained in which all residual stresses are released, to which the decoration in the form of a raised and/or sunken relief is then applied on said softened side by means of a mould, such as a die or stamp.

The sheet can advantageously be heated substantially evenly through its full thickness, preferably by means of hot air circulation.

In a particular embodiment of the invention, the mould is kept at a temperature between the approximate maximum temperature at which the sheet is still hard and the temperature at which the decoration is pressed in the soft sheet.

In a preferred embodiment, the die or stamp is kept in the pressing position after pressing and is cooled along with the sheet until the latter is substantially hard once more.

The invention also concerns an installation for applying the method described above.

Said installation is characterised by the fact that it comprises an oven part and a pressing part, said oven part comprising a thermally insulated chamber which can be closed, in which at least one sheet to be heated can rest substantially horizontally on a support, at a certain distance from the bottom of said chamber, with means being provided to create a stream of hot air around said sheet.

Other characteristics and advantages of the invention may be seen from the following description of a specific embodiment of the method and installation for making decorative panels according to the invention; this description is given for the sake of example only, without limiting the scope of the invention. The reference figures quoted below refer to the attached drawings.

BRIEF DESCRIPTION OF THE DRAWINGS

FIG. 1 is a perspective view with a partial cross section of a decorative panel according to a first embodiment of the invention.

FIG. 2 is a perspective view with a longitudinal section of a decorative panel according to a second embodiment of the invention.

Figure 3:
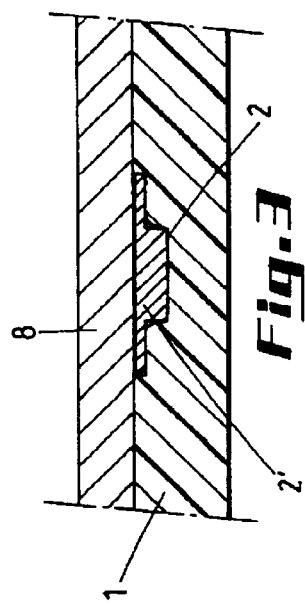
FIG. 3 is a schematic cross section of a detail of a mould and a hard foam sheet with sunken relief.

In the different figures, the same reference figures refer to the same or analogous elements.

DETAILED DESCRIPTION OF THE INVENTION

The decorative panels according to the invention consist of a hard artificial resin foam sheet 1 with decorations 2 in sunken or raised relief.

By "sunken relief" is meant a relief in which the highest point is equal to the surface to which it is applied, while by "raised relief" is meant a relief in which the decorations 2 project outward from the plane of the panel. It is also possible to have a combination of these two types of relief, so that the decorations are partially sunken into the plane of the panel and partly projecting outwards or forwards with respect to this plane.

These decorative panels can for example be used for house doors, doors for kitchen cabinets, garage doors, decorative shutters, shower cabinets, inside doors, partitions, panelling etc. More particularly, these decorative panels can be formed of a sheet 1 of extruded hard PVC with a foam core 3 delimited by a non-cellular outer layer or skin 3'.

Further, this sheet 1 can in some cases be coated with a decorative film 4, for example acrylic film manufactured by the company Renolit-Werke GmbH under the trade name "6576 Renolit MBASII uni" or "6577 Renolit MBASII". The thickness of such a film is generally of the order of 150 to 250 $\mu$m, for example 200 $\mu$m. Suitable artificial resin foam sheets 1 in PVC foam are known under the name "WITTAFOAM S" from the Kummerling company or "VEKAPLAN S" from the Vekaplast company.

FIG. 1 shows a door wing or door panel made of hard foam with a raised relief decoration in the form of projecting, profiled beadings 2.

FIG. 2 relates to another embodiment for a door panel consisting of an artificial resin foam sheet 1 on one side of which is a beading 2 in sunken relief surrounding an opening 5 in which a sheet of single or double glass 6 fits. This glass sheet 6 is held in place by a separate beading 7 attached with adhesive on the opposite side of the artificial resin foam sheet 1, said separate beading 7 together with the beading 2 forming a slot 5' which encloses the edges of the glass sheet. The beading 7 can be obtained by forming e.g. a rectangular opening in an artificial resin foam sheet with a relief decoration which extends along or near the outline of said opening, where said opening is formed on the inside of said relief decoration by e.g. milling.

The method according to the invention for manufacturing the decorative panels described above and shown in the drawings, e.g. on the basis of hard PVC artificial resin foam sheets with or without decorative film, is described in greater detail below.

For simplicity of explanation, the sheet of hard thermoplastic artificial resin foam is hereinafter referred to as "hard foam sheet".

The hard foam sheet 1 is first preferably heated up substantially homogeneously to a temperature at which the sheet becomes soft, such that all residual tensions previously present in the sheet as a result of its extrusion are completely relaxed and a homogeneous, plastic mass is obtained. For this purpose, use is made of hot air circulation, during a period dependent on the thickness and nature of the sheet. Here it is important to note that as a result of this preheating the sheet swells so that its thickness increases by approximately 5 to 10%; as a result of relaxing the residual tensions, which mainly consist of tensile forces in the direction of extrusion, there is significant shrinkage in this direction.

Then, with the help of a mould, which is preferably brought to the same temperature as the soft foam sheet 1, a decoration 2 is applied in sunken or raised relief or a combination of both. The pressure exerted during pressing is such that the sheet 1 is brought substantially to its original thickness and preferably to a smaller thickness. This has the important consequence of increasing the thickness of the outer layers of the foam sheet, which has a favourable effect on the robustness and resistance to damage of the panel thus obtained.

Through the fact that the mould has approximately the same temperature as the hard foam sheet, there is no danger of damage due to thermal shock on contact with said mould. A mould that is too cold can lead to microcracks in the foam sheet. After pressing as described above, the mould is left for a time in contact with the foam sheet 1, while the latter is allowed to cool until it is substantially hard again, after which the mould and the artificial resin foam sheet 1 are separated from each other.

FIG. 3 shows schematically how a sunken relief decoration 2 is obtained in a hard foam sheet 1 by means of a mould 8 on which there is a projecting negative 2' of said decoration 2.

Figure 4:
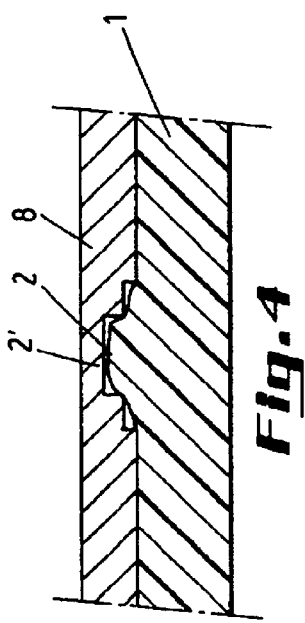
FIG. 4 is a schematic cross section of a mould and a hard foam sheet with raised relief.

FIG. 4 shows in a similar manner how a raised relief decoration 2 is applied to a hard foam sheet 1 by means of a mould 8 in which the negative 2' of the corresponding decoration 2 has been milled out. Here it can be seen that the raised relief decoration 2 is to a certain extent dome-shaped and does not touch the walls of the mould, with the result that the decoration obtains a very smooth surface depending on that of the corresponding negative 2.

In both these figures, the mould 8 is shown in contact with the foam sheet 1, i.e. the so-called pressing position.

When using a hard foam sheet 1 at least one of whose broad sides is coated with a decorative film 4 with a temperature sensitivity higher than that of the artificial resin foam sheet 1, such as e.g. a "Renolit" film, which can be damaged by temperatures higher than 110° C., certain precautions are demanded. Thus, according to the invention, said sheet 1 should preferably be insulated to certain extent, such that the temperature gradient across the film 4 and the hard foam sheet 1 is minimised.

In a specific embodiment of the invention, the hard foam sheet 1 is insulated over the top side by means of a sheet with relatively high heat capacity, for example a so-called "Trespa" sheet, while over the bottom a closed layer of stationary air is formed, which for example is contained in a flat tray open at the top, where said flat tray is relatively close to said foam sheet 1 but however does not touch it.

FIGS. 5 to 8 show a specific embodiment of an installation for applying the method described above, comprising an oven part and a pressing part.

The oven part (FIGS. 5 to 7) has a closed chamber or space 9 with therein fans 10 driven by a motor 10' to provide air circulation in said space 9, a distributor screen 11 for said hot air, attached by means of a suspension 11' at a certain distance from the roof of said space, heating elements 12 for heating the air brought into motion, and a horizontal support 14 for the hard foam sheet 1 to be heated. Under the support 14 is a place where the mould 8, such as a pressing die or stamp, can be preheated.

The distributor screen 11 consists of a grill or a horizontal plate with slots or holes in it. Said screen 11 is located between the heating elements 12 on the one hand and the sheet 1 to be heated on the other, such that a homogeneous air circulation above the sheet 1 is possible, as shown by the arrows 16 in FIG. 6. The edges 13 of the distributor screen 11 are curved so that they slope upwards and extend at a certain distance from the side walls 17. This enables a flow of hot air to be promoted along the side walls. The presence of the distributor screen 11 thus ensures that, by convection, the circulating air results in efficient and substantially homogeneous exchange of heat with the sheet 1 to be treated.

The support 14 for the hard foam sheet 1 is such that it also permits hot air to circulate over the underside of said sheet 1. To this end, according to a specific embodiment of FIGS. 5 to 7, the support 14 consists of two parallel rollers 14 rotating around their axis, at a distance from each other such that they are substantially under the longitudinal edges of the sheet 1. Further, said rollers have an insulating covering, for example on the basis of silicone rubber, which hardly absorbs any heat, in order to prevent burning-in at the point where the sheet 1 rests on the rollers.

For the purpose of introducing the sheet 1 into the oven space 9, in said oven space there are small supporting wheels 23 which can be moved up and down by means of a lever mechanism 26.

Along the side walls 17 of the oven space 9, at a small distance above the rollers 14, are two fixed supporting tablets 15 on which the ends of the sheet 1 rest during the heating process.

Finally, at a certain distance below the level of the rollers 14 and the supporting tablets 15, there is a central supporting plate 24 extending substantially over the full length between the supporting tablets 15.

The supporting wheels 23 are moved downwards sufficiently far below the level of the supporting tablets 15 once the sheet is fully within the oven space 9.

Figure 8:
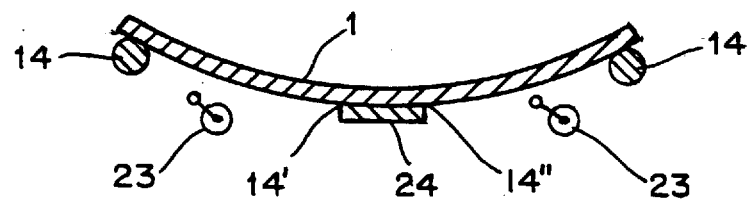
FIG. 8 is a schematic representation of a section VIII—VIII of FIG. 6 with a sagging, soft foam sheet.

As a result of the foam sheet 1 being heated, it becomes weak and sags in the middle until it comes to rest on the supporting plate 24, as shown very schematically in FIG. 8. Here it is necessary to ensure that the side edges 24' and 24" of said supporting plate 24 do not come into contact with the sagging foam sheet 1, in order to prevent ineffaceable traces of said side edges being formed in the foam sheet 1.

Both the tablets 15 and the supporting plate 24 preferably consist of a material with a high thermal insulation value, such that their temperature always remains relatively low while the foam sheet 1 is being heated. More particularly, so-called "Trespa" plates are used for this purpose.

In practice, the central supporting plate 24 is for example 10 cm lower than the tablets 15 and the bottom of the rollers 14. Said supporting plate 24, and preferably also the tablets 15, are polished and have rounded longitudinal edges.

The heating elements 12 can consist of e.g. electrical resistances mounted at the top of the space 9.

The oven in consideration ensures that the hard foam sheet 1 is heated evenly on both of its opposite broad sides by the circulation and distribution of the hot air. The temperature in the oven can be regulated by adjusting the rotor speed of the fans 10 and/or by regulating the temperature of the heating elements 12.

For heating the hard foam sheets 1, which are coated on at least one of their broad sides with a decorative film 4, use is made of a "Trespa" plate (not shown in FIGS. 5 to 7) laid in the space 9 above the hard foam sheet 1. Furthermore, on the underneath of said sheet 1 a stationary layer of air is formed, as already mentioned above. In order to achieve this, a flat tray (not shown) which is open at the top is used. This tray has dimensions such that the sheet 1 to be heated can be laid at a short distance above said tray, with the edges of the tray substantially following the outline of the sheet 1. The tray can for example be placed at a short distance from the bottom of the oven, in order to allow hot air to circulate under said tray.

Figure 7:
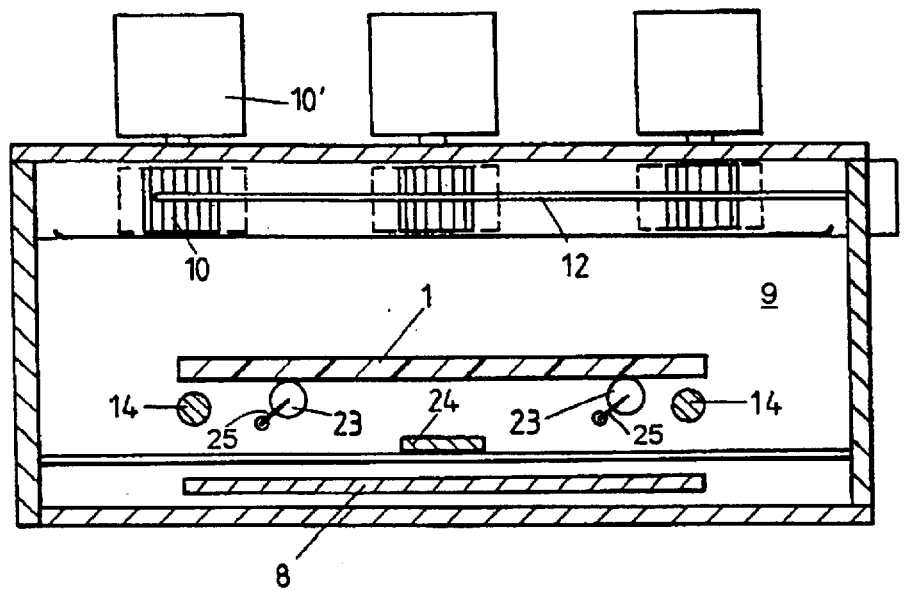
FIG. 7 is a section along line VII—VII in FIG. 5.

As already mentioned above, before the sheet 1 is introduced into the oven space 9 the wheels 23 are raised above the level of the rollers 14 and the tablets 15, so that the sheet only rests on said wheels 23. Once the sheet 1 is fully inside the oven space 9, as shown in FIG. 7, the wheels 23 are brought into their lowered position as shown in FIG. 8, so that the sheet 1 comes to rest on the rollers 14 and the tablets 15. Once the sheet 1 has been brought into a soft condition at the desired temperature in this position, so that it is in the condition as shown in FIG. 8, it is lifted once more from the rollers 14 and the tablets 15 into the position shown in FIG. 7, and is rolled out of the oven space 9 by means of the wheels 23, in order to be transferred to the pressing part.

Figure 9:
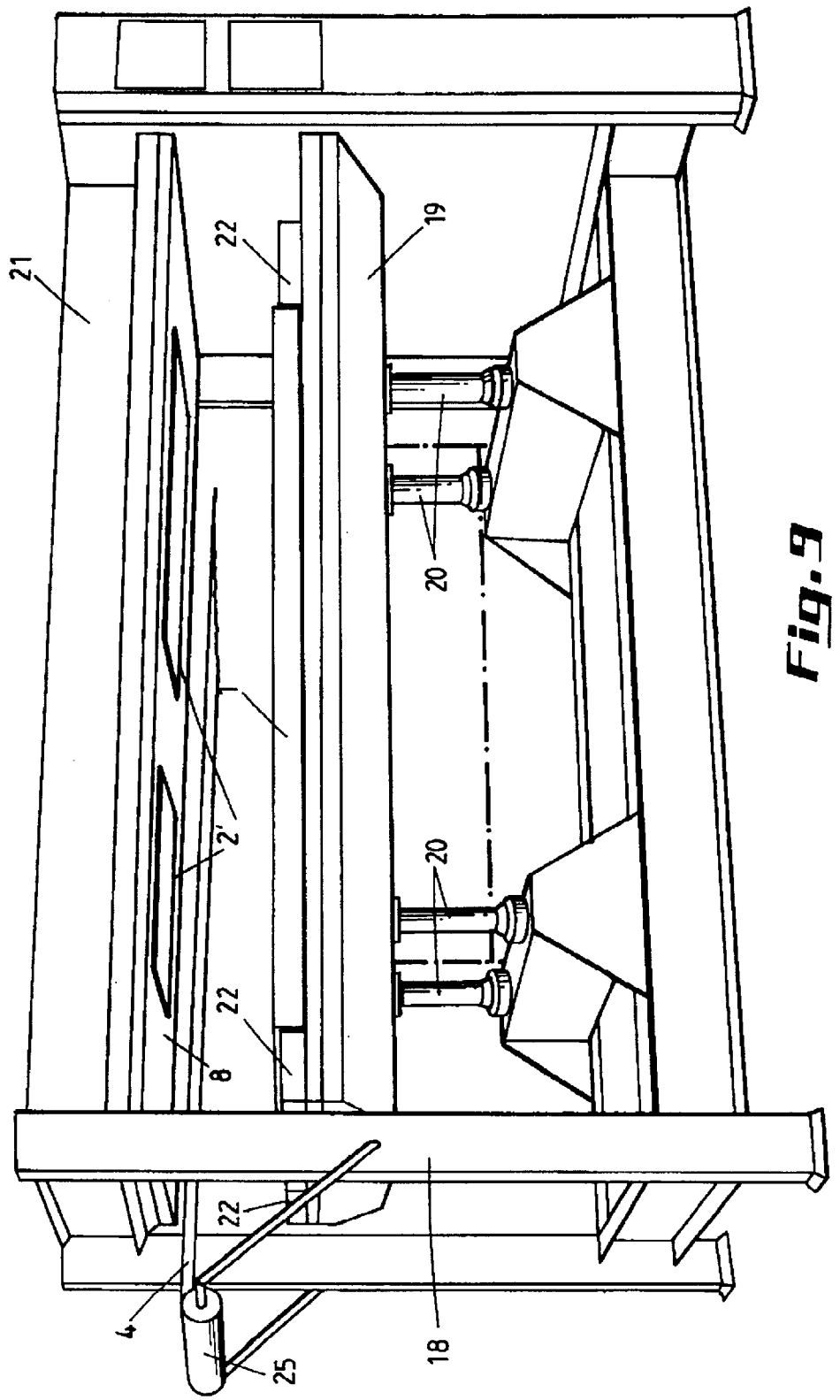
FIG. 9 is a perspective view with a partial cross section of the pressing section of the installation according to the same embodiment.

The pressing part (FIG. 9) of the installation according to this embodiment comprises a chassis 18 in which is mounted a horizontal pressing table 19 which by means of suction cups 20 can be moved up and down between a so-called pressing position, in which the sheet 1 located on the pressing table 19 is pressed at the top in the press, and a rest position, as shown in FIG. 9, in which the pressing table 19 and the mould 8 are at a certain distance from each other.

The mould 8 is removably mounted on a horizontal framework 21 at the top in the chassis 18, with its underneath facing downwards. This offers the advantage that no large dust particles, carried along in the hot air stream, can settle on the mould. The mould 8 consists of a pressing plate made of a hard material which is preferably dimensionally stable at relatively high temperature and which furthermore has a good heat capacity. Decorations 2' are attached to said pressing plate by means of screws or adhesive, so as to obtain a sunken relief in the artificial resin foam sheet 1. Said decorations 2' can also be milled out, so that in this case a raised relief 2 is obtained in the sheet 1. The decorations 2' attached to the pressing plate 8 can for example consist of cast tin, or can be milled out of an aluminium block. Cast tin offers the advantage that it can be recycled.

Good results are obtained using a so-called "Trespa" plate as the pressing plate 8.

The heated hard foam sheet 1 has to be placed on the pressing table 19. Calibration blocks 22 can be laid along said sheet 1, so as to determine the minimum thickness of the sheet on pressing. To this end, the pressing table 19 is moved upwards until the calibration blocks 22 come into contact with the mould 8. At that moment the relief of the mould 8 is pressed into the hard foam sheet 1.

If the foam sheet 1 is to be provided with a decorative film 4, said film 4 can if necessary be applied in the pressing part itself, onto the still soft sheet 1, before the relief is pressed into said sheet.

To this end, as shown in FIG. 9, from a roll 25 said film 4 is unrolled between the mould 8 and the pressing table 9, above the soft foam sheet 1 resting on said pressing table. Said film can be given a layer of adhesive on its underside beforehand, or such a layer of adhesive can be applied e.g. by spraying onto the upper side of the sheet 1 or onto the underside of the film 4.

When the press closes, in order to form the relief, the film 1 is pressed against the sheet 1 at the same time. A knife (not shown) enables the film strip glued to the foam sheet 1 to be trimmed off.

To further illustrate the invention, a few examples of actual embodiments are described below.

EXAMPLE 1

Figure 6:
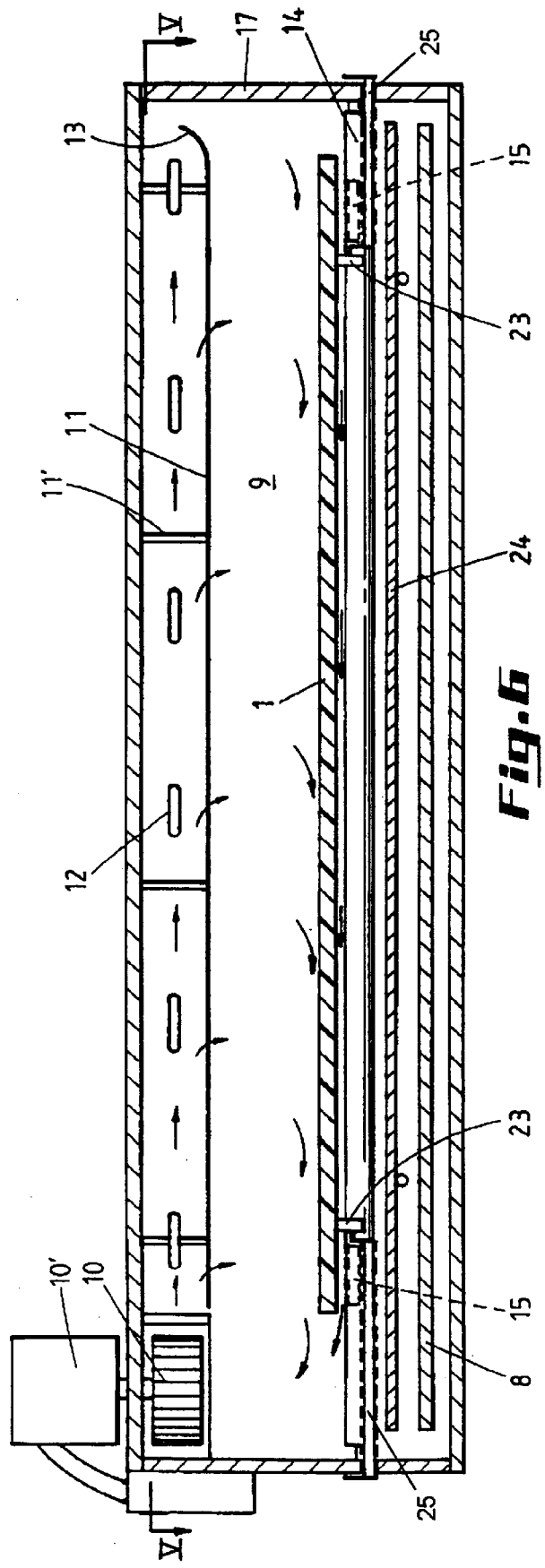
FIG. 6 is a section along line VI—VI in FIG. 5.
Figure 5:
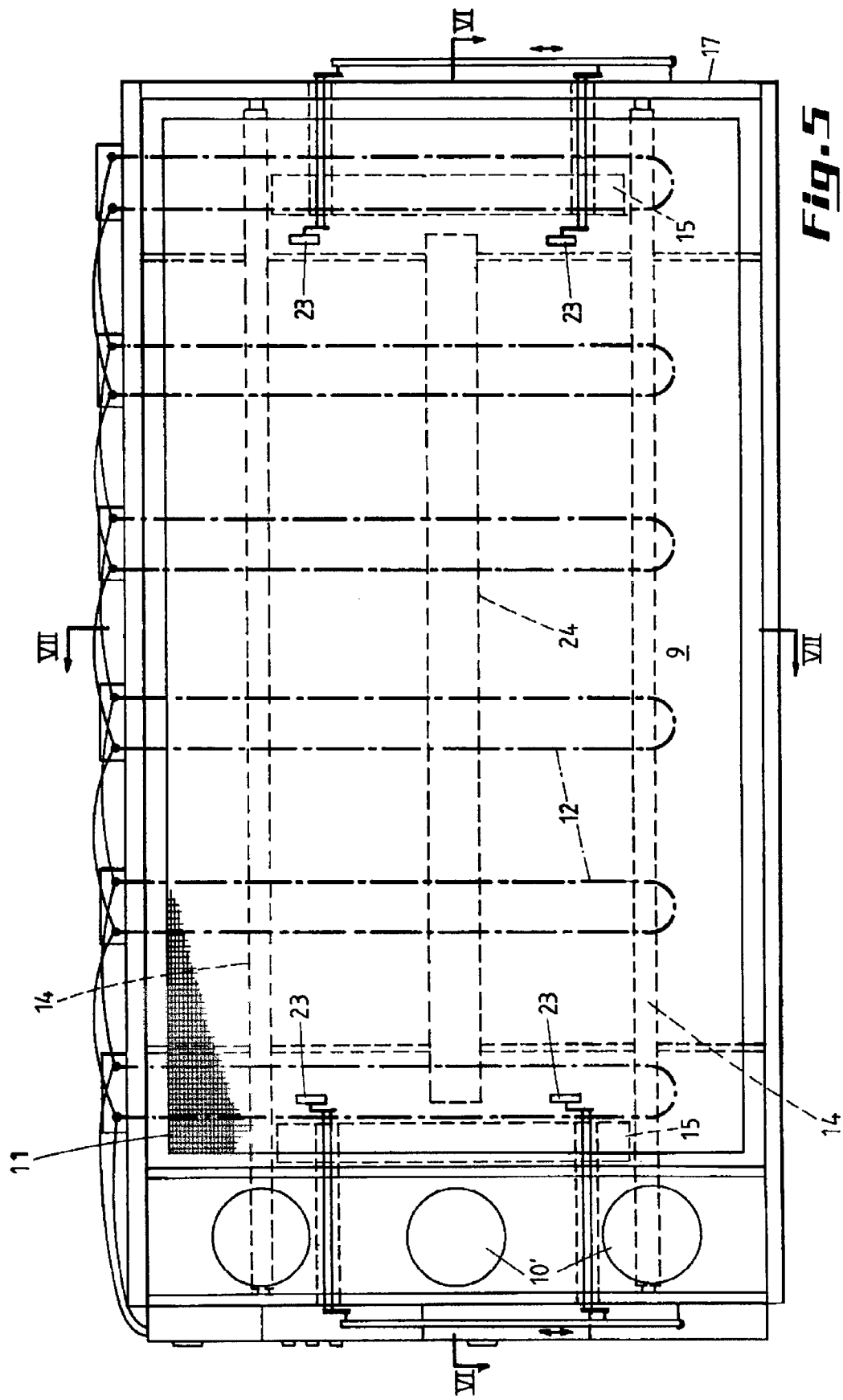
FIG. 5 is a schematic vertical cross section of an oven part of a particular embodiment of an installation according to the invention, for heating a hard foam sheet.

A hard PVC artificial resin sheet 1 of 1000 ×2050 mm and with a thickness of 19 mm is placed in the space 9 of an oven, as shown in FIGS. 5 to 7, at a temperature of 140° C. for 20 minutes. At that moment the sheet 1 is sufficiently soft for a relief to be pressed into said sheet 1 by means of a mould 8, under the permitted pressure of the press used, without stress concentrations and/or cracking occurring. The mould 8 used for pressing is at the same time placed on the bottom of the oven space 9 in order to be heated to the same temperature as the sheet 1. After these 20 minutes the mould is first removed from the oven space 9 and then attached to the framework 21 of a press of the NCP type from the company ORMA, as shown in FIG. 9. The mould 8 consisted of a "Trespa" plate on which profile strips 2' were screwed on one side and in which profiled grooves 2' were milled out on the other side. The hard foam sheet 1 was then laid on the pressing table 19. The pressing table 19 was moved upwards so that the mould 8 was pressed against the hard foam sheet 1. The applied pressure amounted to approximately 120 bar.

This assembly was then allowed to cool for 10 minutes to around 70° C., until the moment when the sheet 1 was sufficiently stiff. The pressing table 19 was then lowered so that the hard foam sheet 1 was removed from the mould 8. In this way, a hard foam sheet with relief decoration was obtained, i.e. a finished product in which the relief decorations form a whole with the base sheet of hard foam.

EXAMPLE 2

The same method using the same installation as in example 1 was applied with a PVC hard foam sheet of 24 mm thick which was heated for 35 minutes at 140° C. in the above-mentioned oven space 9 so as to obtain softening of said sheet 1 such that a beading in raised relief was obtained on one of its surfaces by means of a suitable mould 8.

EXAMPLE 3

A PVC artificial resin foam sheet of 10 mm thick and 1000×1000 a was placed for 15 minutes in the oven space 9 at a temperature of 120° C., after which a deccoration in the form of a beading 2 was pressed into it. Around and within said beading, material was removed by milling so as to obtain a rectangular window frame 7. Further, an opening S was milled out of a decorative panel with thickness 19 mm or 24 mm, made according to the method described in example 1 or 2, such that a glass sheet 6 fitted in said opening. Said opening 5 was milled out in such a way that the glass sheet rested against an edge on one side of the decorative panel. Said glass sheet 6 was placed in the opening of the decorative panel, after which the milled out window frame 7 was attached with adhesive such that the glass sheet 6 was fixed between the frame 7 and the decorative panel, as shown in FIG. 2.

The invention is of course in no way limited to the specific embodiments of the invention described above and shown in the accompanying figures; on the contrary, different variations can be considered while still remaining within the scope of the invention, amongst other things as regards the type of artificial resin foam sheets used, the form of the decorations, the method applied and the installation used.

Thus it is possible, for example in order to obtain a wing of a door, to glue together the flat sides of two decorative panels which each have a broad flat side, such that a relief decoration is obtained on both sides of he door wing.

Further, the oven part and the pressing part can form a single whole, so that the heating of the hard foam plate is actually carried out in the pressing part itself.

Instead of PVC hard foam sheets, sheets with another chemical composition can be used, such as polypropylene sheets, provided they have the required thickness and strength. It is sufficient for these sheets to have essentially a closed cell structure, and for them to become sufficiently soft, to a certain depth at a raised temperature, for a relief decoration to be applied to them by pressing, without them shoving signs of deterioration due to the heat. The sheets' should therefore be made preferably of a thermoplastic material or material that behaves in a similar manner on heating.

These sheets can if necessary be provided with internal reinforcement, or can be destined to be attached on a particular base sheet. In this way the panels according to the invention can be used to form sandwich panels with e.g. a core of fire resistant material, in order to form fireproof doors.

In some cases, e.g. with relatively thick sheets, these can only be softened to a certain thickness.

Further, it is usually sufficient to heat up the mould 8 only once in the oven part, as described above, before carrying out the pressing operation.

If no space is provided at the bottom of the oven for preheating the mould 8, said mould can be brought up to temperature on the rollers 14 before the sheet 1 is introduced. The preheated oven is then placed in the pressing part, just before the sheet 1 is heated. When the pressing operation is then carried out on the soft sheet, it will still be at sufficiently high temperature.

After the pressing operation has been carried out, the mould is kept pressed against the sheet until said sheet has become hard again, i.e. until it has reached a temperature usually of the order of 70° C. For the next pressing operations with another softened sheet it is generally no longer necessary to again preheat the mould, which consequently has a temperature of around 70° C.; instead, this plate can be immediately pressed against the softened sheet. The pressure applied can vary between relatively wide limits. Good results are found to be obtained with a pressure of between 80 and 200 bar.

If the foam sheet 1 consists of a thermoplastic material, it can be recycled in a very simple way. In this case it is thus also possible to subsequently alter the relief applied to the panel.

It is also possible, either before the sheet is preheated or after it has been softened, to apply a layer of paint to it, such as a layer of varnish, for example by spraying, before the sheet is subjected to the pressing operation.

I claim:

1. Method for manufacturing decorative panels with a relief decoration (2) on at least one broad side thereof, comprising heating substantially evenly a hard, at least partly thermoplastic artificial resin foam sheet (1), having a closed cell structure, such that said foam sheet becomes soft, and residual tensions in said sheet are relaxed, thereby enabling sheet swelling so that its thickness increases, and in a second step, said decoration (2) in raised and/or sunken relief being then applied to said side by pressing, by means of a mould, whose temperature is between substantially the maximum at which said sheet (1) is still relatively hard and the temperature of the softened sheet (1) at the moment of pressing said decoration (2), and, in a third step, after said pressing, said mould (8) is kept in pressing position in contact with said sheet (1), while allowing the latter to cool until it is again substantially hard, after which said sheet (1) is removed from said mould (8).

2. Method according to claim 1, characterised in that said sheet (1) is substantially evenly heated by means of hot air circulation.

3. Method according to claim 1, characterised in that, when use is made of a sheet (1), at least one of whose broad sides is coated with a decorative film (4) with greater temperature sensitivity than that of the artificial resin foam of which the sheet (1) consists, said decorative film (4) to a certain extent insulates said sheet (1) when said sheet (1) is heated up, so as to limit the temperature gradient through the film (4) and the artificial resin foam to a minimum, and thus to obtain a substantially constant temperature in the film (4) and the artificial resin foam (1).

4. Method according to claim 3, characterised in that during heating, the upper side of the artificial resin foam sheet (1) is protected by means of an insulating sheet, and that a closed, stationary layer of air is formed on the underneath of said foam sheet.

5. Method according to claim 1, characterised in that a polyvinyl chloride or polypropylene foam sheet is used.

6. Apparatus for manufacturing a decorative panel with a relief decoration, comprising an oven and a pressing device for pressing said relief decoration into said sheet; said oven comprising a thermally insulated chamber (9) which is operable/closeable and in which at least one sheet (1) to be heated is disposed substantially horizontally on support means generally near the bottom of said chamber (9), with means (10, 11, 12) provided for obtaining a flow of hot air around said sheet (1); said support means for said sheet including a pair of parallel rollers (14) disposed a predetermined distance from each other so as to enable contact between the hot air flow and the underside of said sheet (1): said pair of parallel rollers (14) being movable below the level of other fixed elongated supports (15). located along the side walls of the oven, which the ends of the sheet (1) rest during heating: and that said support means has upright edges extending substantially following the edges of said sheet (1), so as to enclose a layer of air between the sheet and said upright edges: and a plurality of movable supporting wheels (23). for assisting in introducing the sheet 1 into the oven, and which are adapted to be moved up and down.

7. Installation according to claim 6, characterised in that said edges form the side walls of a tray open at the top which can be placed in the chamber (9) at a certain distance from the bottom of said chamber.

8. The apparatus according to claim 6, wherein said pressing device comprises a horizontal table (19) which can move up and down, on which said sheet (1) to be pressed is placed, and that a mould (8) such as a die or stamp is mounted above said sheet (1), horizontally, against which the sheet to be pressed is pressed by the upwards motion of the table (19).

9. Installation according to claim 8, characterised in that calibration blocks (22) are placed, removably or otherwise, between the table (19) and the mould (8), where said blocks enable a predetermined distance to be maintained between the mould (8) and the table (19) during the pressing of the sheet (1) located on the table (19).

* * * * *